US012777402B2

(12) United States Patent
Kaur et al.

(10) Patent No.: US 12,777,402 B2
(45) Date of Patent: Oct. 27, 2026

(54) METHODS, APPARATUSES, AND SYSTEMS FOR NETWORK ACCESSIBILITY

(71) Applicant: Comcast Cable Communications, LLC, Philadelphia, PA (US)

(72) Inventors: Samian Kaur, Plymouth Meeting, PA (US); Aditya Pathak, Prosper, TX (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 634 days.

(21) Appl. No.: 18/194,912

(22) Filed: Apr. 3, 2023

(65) Prior Publication Data

US 2023/0319675 A1 Oct. 5, 2023

Related U.S. Application Data

(60) Provisional application No. 63/326,634, filed on Apr. 1, 2022.

(51) Int. Cl.
*H04W 40/02* (2009.01)
*H04W 76/11* (2018.01)
*H04W 88/06* (2009.01)

(52) U.S. Cl.
CPC ............ *H04W 40/02* (2013.01); *H04W 76/11* (2018.02); *H04W 88/06* (2013.01)

(58) Field of Classification Search
None
See application file for complete search history.

(56) References Cited

U.S. PATENT DOCUMENTS

| | | | |
|---|---|---|---|
| 8,098,818 B2 | 1/2012 | Grilli et al. |
| 10,135,746 B2 | 11/2018 | Ho et al. |
| 10,516,990 B2 | 12/2019 | Wane |
| 11,356,897 B2 | 6/2022 | Salkintzis |
| 11,432,357 B2 | 8/2022 | Wang |
| 11,503,025 B2 | 11/2022 | Westerling |
| 11,528,218 B2 | 12/2022 | Kolar et al. |

(Continued)

FOREIGN PATENT DOCUMENTS

| | | |
|---|---|---|
| CN | 106664558 B | 1/2020 |
| JP | 2019153151 | 9/2019 |

(Continued)

OTHER PUBLICATIONS

Bonaventure et al., "O-RTT TCP Convert Protocol; rfc8803.txt," 0-RTT TCP Convert Protocol; RFC8803.txt, Internet Engineering Task Force, IETF; 2020, https://tools.ietf.org/html/rfc8803.

(Continued)

*Primary Examiner* — Christine T Duong
(74) *Attorney, Agent, or Firm* — Ballard Spahr LLP

(57) ABSTRACT

Method, apparatuses, and systems are described for determining a connection with the user device based on a request to activate a user device on a network of a first operator according to a first identifier of a subscriber configured to grant access to a network of a second operator. The connection may be configured for communication over a plurality of paths based on an identifier of the connection. The user device may be configured to store the first identifier of the subscriber and a second identifier of the subscriber. The network of the first operator may be accessible according to the first identifier of the subscriber.

20 Claims, 6 Drawing Sheets

(56) References Cited

U.S. PATENT DOCUMENTS

| | | | |
|---|---|---|---|
| 11,540,184 | B1 | 12/2022 | Marupaduga |
| 11,564,132 | B2 | 1/2023 | Suh et al. |
| 11,689,966 | B2 | 6/2023 | Sahin et al. |
| 11,736,224 | B2 | 8/2023 | Wang et al. |
| 11,758,460 | B1 | 9/2023 | Myron et al. |
| 12,199,851 | B2 | 1/2025 | Tian et al. |
| 2003/0171112 | A1 | 9/2003 | Lupper et al. |
| 2006/0153135 | A1 | 7/2006 | Ascolese et al. |
| 2011/0128918 | A1 | 6/2011 | Zhai |
| 2012/0026933 | A1 | 2/2012 | Aso et al. |
| 2012/0093150 | A1 | 4/2012 | Kini |
| 2012/0287781 | A1 | 11/2012 | Maria |
| 2012/0320989 | A1 | 12/2012 | Ameres et al. |
| 2013/0065557 | A1 | 3/2013 | Zhang et al. |
| 2013/0122906 | A1 | 5/2013 | Klatt |
| 2013/0166507 | A1 | 6/2013 | Staczek |
| 2014/0141763 | A1 | 5/2014 | Suh et al. |
| 2015/0138962 | A1 | 5/2015 | Tipton et al. |
| 2015/0296415 | A1 | 10/2015 | Ling et al. |
| 2015/0312383 | A1 | 10/2015 | Roeland et al. |
| 2017/0272801 | A1 | 9/2017 | Chen et al. |
| 2018/0206081 | A1 | 7/2018 | Kim et al. |
| 2018/0213454 | A1 | 7/2018 | Santhanam et al. |
| 2018/0278545 | A1 | 9/2018 | Andreoli-Fang |
| 2018/0279203 | A1 | 9/2018 | da Silva et al. |
| 2019/0007826 | A1 | 1/2019 | Wane |
| 2019/0010702 | A1 | 1/2019 | Lloyd |
| 2019/0058798 | A1 | 2/2019 | Lentz et al. |
| 2019/0098488 | A1 | 3/2019 | Syed et al. |
| 2019/0246334 | A1 | 8/2019 | Wang et al. |
| 2019/0261261 | A1 | 8/2019 | Ishii |
| 2019/0306068 | A1 | 10/2019 | Kiss et al. |
| 2019/0349849 | A1 | 11/2019 | Kavuri et al. |
| 2019/0357119 | A1 | 11/2019 | Hong et al. |
| 2020/0084835 | A1 | 3/2020 | Wang et al. |
| 2020/0236149 | A1 | 7/2020 | Mufti et al. |
| 2020/0304951 | A1 | 9/2020 | Beaurepaire |
| 2020/0314629 | A1 | 10/2020 | Kreishan |
| 2020/0314936 | A1 | 10/2020 | Kawasaki et al. |
| 2020/0323005 | A1 | 10/2020 | Chin et al. |
| 2020/0367306 | A1 | 11/2020 | Wang |
| 2020/0413466 | A1 | 12/2020 | Yu |
| 2021/0195408 | A1 | 6/2021 | Yang et al. |
| 2021/0234729 | A1 | 7/2021 | Cloonan et al. |
| 2021/0274339 | A1 | 9/2021 | Sevindik et al. |
| 2022/0053406 | A1 | 2/2022 | Lee et al. |
| 2022/0086742 | A1 | 3/2022 | Arrobo Vidal et al. |
| 2022/0110177 | A1* | 4/2022 | Choksi .................. H04W 76/16 |
| 2022/0167221 | A1 | 5/2022 | Lee |
| 2022/0232366 | A1 | 7/2022 | Seo |
| 2022/0303854 | A1 | 9/2022 | Salkintzis et al. |
| 2022/0345887 | A1 | 10/2022 | Karampatsis et al. |
| 2022/0417841 | A1 | 12/2022 | Chak et al. |
| 2023/0012793 | A1 | 1/2023 | Chak et al. |
| 2023/0052857 | A1* | 2/2023 | Lee ........................ H04W 40/12 |
| 2023/0095401 | A1 | 3/2023 | Sivanesan et al. |
| 2023/0132058 | A1 | 4/2023 | Youn et al. |
| 2023/0216852 | A1 | 7/2023 | Salkintzis |
| 2023/0217230 | A1 | 7/2023 | Sood et al. |
| 2023/0230069 | A1 | 7/2023 | Voorhees et al. |
| 2023/0232198 | A1 | 7/2023 | Salkintzis |
| 2023/0269556 | A1 | 8/2023 | Li et al. |
| 2023/0284126 | A1 | 9/2023 | Nayak et al. |
| 2023/0300679 | A1 | 9/2023 | Chen |
| 2023/0319685 | A1 | 10/2023 | Talebi Fard et al. |
| 2023/0328593 | A1 | 10/2023 | Qiao et al. |
| 2023/0413114 | A1 | 12/2023 | Ly et al. |

FOREIGN PATENT DOCUMENTS

| | | | |
|---|---|---|---|
| WO | 2013166507 | A1 | 11/2013 |
| WO | 2018206081 | A1 | 11/2018 |
| WO | 2019010702 | A1 | 1/2019 |
| WO | 2019095191 | A1 | 5/2019 |

OTHER PUBLICATIONS

ETSI TS 123 501 V15.2.0 Release 15, 3GPP TS 23.501, "Systems Architecture for the 5G System," 2018.

ETSI TS 123 502 V15.2.0 Release 15, 3GPP TS 23.502, "Procedures for the 5G System," 2018.

Ford, A. et al. "TCP Extensions for Multipath Operation with Multiple Addresses," Internet Engineering Task Force (IETF), 2013.

3rd Generation Partnership Project; Technical Specification Group Core Network and Terminals; 5G System; Access Traffic Steering, Switching and Splitting (ATSSS); Stage 3, 2021, Release 17.

"5G; Security Architecture and Procedures for 5G System (3GPP TS 33.501 version 16.8.0 Release 16)," ETSI Technical Specification, European Telecommunications Standards Institute (ETSI), vol. 3GPP SA, No. V16.8.0, Sep. 27, 2021, http://www.etsi.org/deliver/etsi_ts/133500_133599/133501/16.08.00_60/ts_133501v160800p.pdf (259 pages).

W. Dong et al., "iDEAL: Incentivized Dynamic Cellular Offloading via Auctions," in IEEE/ACM Transactions on Networking, vol. 22, No. 4, pp. 1271-1284, Aug. 2014, doi: 10.1109/TNET.2013.2273766. Website: <https://ieeexplore.ieee.org/abstract/document/> 6582689 (Year: 2014).

* cited by examiner

METHODS, APPARATUSES, AND SYSTEMS FOR NETWORK ACCESSIBILITY

CROSS-REFERENCE TO RELATED APPLICATIONS

This application claims the benefit of U.S. Provisional Application No. 63/326,634, filed Apr. 1, 2022, which is incorporated herein in its entirety.

BACKGROUND

Network operators provide access to networks and the Internet. Some network operators may provide multiple types of services for access. For example, a multiple service operator (MSO) may provide access through both Wi-Fi (e.g., IEEE 802.11 based protocols) access points and cellular nodes (e.g., 3GPP 5G Node B). A mobile network operator (MNO) may provide access to networks and the Internet through cellular nodes. User equipment (e.g., a user device) may be configured with a subscriber identity module and other technology to connect with networks. The establishment of connections between user equipment and networks can result in increased retransmission rates, reduced throughput, and other network challenges.

SUMMARY

It is to be understood that both the following general description and the following detailed description are exemplary and explanatory only and are not restrictive. Methods, apparatuses, and systems for improved network accessibility are described.

An MSO or other network operator may provide an offload service for cellular providers by providing network protocol access points. In order to connect to the MSO through the network access points or other components, the MSO may send an eSIM package for installation on the user device, and the MSO may ask the user device for permission before sending eSIM credentials.

Interconnections between the user device and the MSO or MNO may require maintenance of a session or connection based on a session-based or a connection-based protocol. Access to different access points and nodes may change as a location of the user device changes over time. The connection may be maintained by creating subflows based on the connection. The subflows may be generated for each node or access point available to the user device. The subflows may be deconstructed as the user device moves beyond the range of each node or access point and the subflows may be created as the user device falls within the area of reception of new access points or nodes.

BRIEF DESCRIPTION OF THE DRAWINGS

In order to provide understanding techniques described, the figures provide non-limiting examples in accordance with one or more implementations of the present disclosure, in which.

DETAILED DESCRIPTION

Figure 1:
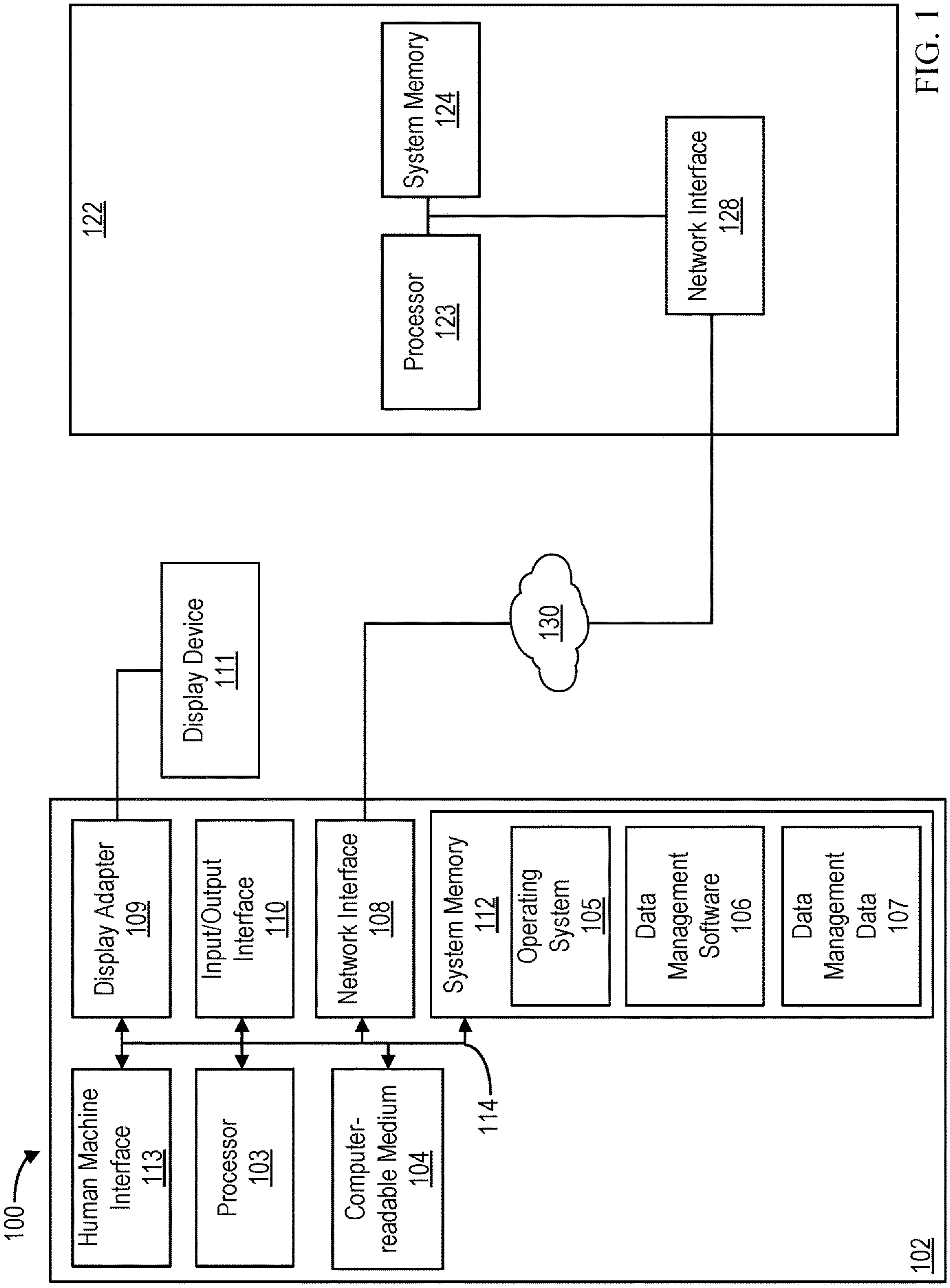
FIG. 1 shows an example system in accordance with one or more implementations of the present disclosure.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another configuration includes from the one particular value and/or to the other particular value. When values are expressed as approximations, by use of the antecedent "about," it will be understood that the particular value forms another configuration. It will be further understood that the endpoints of each of the ranges are significant both in relation to the other endpoint, and independently of the other endpoint.

"Optional" or "optionally" means that the subsequently described event or circumstance may or may not occur, and that the description includes cases where said event or circumstance occurs and cases where it does not.

Throughout the description and claims of this specification, the word "comprise" and variations of the word, such as "comprising" and "comprises," means "including but not limited to," and is not intended to exclude other components, integers or steps. "Exemplary" means "an example of" and is not intended to convey an indication of a preferred or ideal configuration. "Such as" is not used in a restrictive sense, but for explanatory purposes.

It is understood that when combinations, subsets, interactions, groups, etc. of components are described that, while specific reference of each various individual and collective combinations and permutations of these may not be explicitly described, each is specifically contemplated and described herein. This applies to all parts of this application including, but not limited to, steps in described methods. Thus, if there are a variety of additional steps that may be performed it is understood that each of these additional steps may be performed with any specific configuration or combination of configurations of the described methods.

This detailed description may refer to a given entity performing some action. It should be understood that this language may in some cases mean that a system (e.g., a computer) owned and/or controlled by the given entity is actually performing the action.

As will be appreciated by one skilled in the art, hardware, software, or a combination of software and hardware may be implemented. Furthermore, the methods and systems may take the form of a computer program product on a computer-readable storage medium (e.g., non-transitory) having processor-executable instructions (e.g., computer software) embodied in the storage medium. Any suitable computer-readable storage medium may be utilized including hard disks, CD-ROMs, optical storage devices, magnetic storage devices, memresistors, Non-Volatile Random Access Memory (NVRAM), flash memory, or a combination thereof.

Throughout this application reference is made to block diagrams and flowcharts. It will be understood that each block of the block diagrams and flowcharts, and combinations of blocks in the block diagrams and flowcharts, respectively, may be implemented by processor-executable instructions. These processor-executable instructions may be loaded onto a special purpose computer or other programmable data processing instrument to produce a machine, such that the processor-executable instructions which execute on the computer or other programmable data processing instrument create a device for implementing the steps specified in the flowchart block or blocks.

These processor-executable instructions may also be stored in a non-transitory computer-readable memory or a computer-readable medium that may direct a computer or other programmable data processing instrument to function in a particular manner, such that the processor-executable instructions stored in the computer-readable memory produce an article of manufacture including processor-executable instructions for implementing the function specified in the flowchart block or blocks. The processor-executable instructions may also be loaded onto a computer or other programmable data processing instrument to cause a series of operational steps to be performed on the computer or other programmable instrument to produce a computer-implemented process such that the processor-executable instructions that execute on the computer or other programmable instrument provide steps for implementing the functions specified in the flowchart block or blocks.

Blocks of the block diagrams and flowcharts support combinations of devices for performing the specified functions, combinations of steps for performing the specified functions and program instruction means for performing the specified functions. It will also be understood that each block of the block diagrams and flowcharts, and combinations of blocks in the block diagrams and flowcharts, may be implemented by special purpose hardware-based computer systems that perform the specified functions or steps, or combinations of special purpose hardware and computer instructions.

The method steps recited throughout this disclosure may be combined, omitted, rearranged, or otherwise reorganized with any of the figures presented herein and are not intend to be limited to the four corners of each sheet presented.

The techniques disclosed herein may be implemented on a computing device in a way that improves the efficiency of its operation. As an example, the methods, instructions, and steps disclosed herein may improve the functioning of a computing device.

Mobile virtual network operators (MVNO) can deploy wireless networks and provide access to those networks. An MVNO may have a choice between several networks to transfer data. For example, an MVNO may leverage a primary SIM on a device to connect with a first network and secondary SIM that can be activated to transfer data over a second network. The second network may include access points that may be configured to communicate over 802.11 based protocols.

Installation, activation, or combinations thereof of an eSIM may be a network intensive task. The installation, activation, or combination thereof may be directed based on location and/or network conditions. Installation and activation may be further based on a request sent to the user device. For example, the MVNO may send a request to the user device over the primary network or the secondary network to determine whether the user device would like to establish communications over the second network.

A multipath connection may be created to establish a constant connection with application servers while allowing connections to cellular nodes and other access points without requiring new connections to be established. For example, a connection or session may be established with a computing device or application server based on an identifier and a subscription. Additional subflows may be generated for each cellular node or access point available based on the identifier and subscription. An order of operations may be configured to reset subflows based on the type of access point or node being accessed and the number of subflows connected.

FIG. 1 shows an example system 100 in accordance with one or more applications of the present disclosure. The system 100 may comprise a device 102, a display device 111, and one or more computing devices 122. The device 102 may comprise one or more processors 103, a system memory 112, and a bus 114 that couples various components of the device 102 including the one or more processors 103 to the system memory 112. In the case of multiple processors 103, the device 102 may utilize parallel computing.

The bus 114 may comprise one or more of several possible types of bus structures, such as a memory bus, memory controller, a peripheral bus, an accelerated graphics port, and a processor or local bus using any of a variety of bus architectures.

The device 102 may operate on and/or comprise a variety of user device readable media (e.g., non-transitory). User device readable media may be any available media that is accessible by the device 102 and comprises, non-transitory, volatile and/or non-volatile media, removable and non-removable media. The system memory 112 has user device readable media in the form of volatile memory, such as random access memory (RAM), and/or non-volatile memory, such as read only memory (ROM). The system memory 112 may store data such as data management data 107 and/or programs such as operating system 105 and data management software 106 that are accessible to and/or are operated on by the one or more processors 103.

The device 102 may also comprise other removable/non-removable, volatile/non-volatile user device storage media. The computer-readable medium 104 may provide non-volatile storage of user device code, user device readable instructions, data structures, programs, and other data for the device 102. The computer-readable medium 104 may be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Any number of programs may be stored on the computer-readable medium 104. An operating system 105 and data management software 106 may be stored on the computer-readable medium 104. One or more of the operating system 105 and software 106 (e.g., mobile applications), or some combination thereof, may comprise program and the data management software 106. Data management data 107 may also be stored on the computer-readable medium 104. Data management data 107 may be stored in any of one or more databases known in the art. The databases may be centralized or distributed across multiple locations within the network 130.

A user may enter commands and information into the device 102 via an input device. For example, the input devices may comprise, but are not limited to, a keyboard, pointing device (e.g., a computer mouse, remote control), a microphone, a joystick, a scanner, tactile input devices such as gloves, and other body coverings, motion sensors, and the like. These and other input devices may be connected to the one or more processors 103 via a human machine interface 113 that may be coupled to the bus 114, but may be connected by other interface and bus structures, such as a parallel port, game port, an IEEE 1394 Port (e.g., a Firewire port), a serial port, network interface 108, and/or a universal serial bus (USB).

The display device 111 may be connected to the bus 114 via an interface, such as a display adapter 109. In an example, the device 102 may comprise more than one display adapter 109 and the device 102 may have more than one display device 111. A display device 111 may comprise a monitor, an LCD (Liquid Crystal Display), light emitting diode (LED) display, television, smart lens, smart glass, and/or a projector. In addition to the display device 111, other output peripheral devices may comprise components such as speakers and a printer which may be connected to the device 102 via Input/Output Interface 110. Any step and/or result of the methods may be output (or caused to be output) in any form to an output device. Such output may be any form of visual representation, including, but not limited to, textual, graphical, animation, audio, tactile, and the like. The display device 111 and the device 102 may be part of one device, or separate devices.

The device 102 may operate in a networked environment using logical connections to one or more computing devices 122. The computing device 122 may comprise a personal computer, computing station (e.g., workstation), portable computer (e.g., laptop, mobile phone, tablet device), smart device (e.g., smartphone, smart watch, activity tracker, smart apparel, smart accessory), security and/or monitoring device, a server, a router, a network computer, a peer device, edge device or other common network node, and the like. Logical connections between the device 102 and the computing device 122 may be made via a network 130. Such network connections may be through a network interface 108. The network interface 108 may be implemented in both wired and wireless environments.

Application programs and other executable program components such as the operating system 105 are shown herein as discrete blocks, although it is recognized that such programs and components may reside at various times in different storage components of the device 102, and are executed by the one or more processors 103 of the device 102. The computing device 122 may include all of the components described with regard to the device 102.

The device 102 may comprise one or more components configured to communicate over electromagnetic waves or other mediums. The device 102 may be configured with one or more subscriber identity modules (SIM). The SIM may be stored in persistent memory, embedded, physical, or combinations thereof. In such a way, the SIM may form a credential circuit as data stored permanently or otherwise on the device 102. The SIM may be configured for Dual SIM Dual Standby (DSDS). For example, the primary SIM of the DSDS may be a physical SIM (pSIM) and the secondary SIM may be an embedded SIM (eSIM). The SIM may include one or more pairs of unique identifiers and keys. Information may be stored on a particular chip or combinations of chips, the computer-readable medium 104, or otherwise.

The device 102 may be configured to communicate over a network interface 108. The network interface 108 may be configure with a radio or other electromagnetic spectrum transceiver. The network interface 108 may be combined with a SIM, and identification numbers (e.g., international mobile subscriber identity, local area identity) and keys therein (e.g., $k_i$), for secure communications.

The device 102 may be configured to communicate with the computing device 122 over a network 130. Such communication paths may include wired communication technologies, wireless communication technologies, or combinations thereof. Wireless communication technologies may include various 3GPP standards (e.g., LTE, 5G) and Institute of Electrical and Electronics Engineers (IEEE) standards (e.g., 802.11). Wired communication technologies may include various IEEE standards (e.g., 802.3). While various communication technologies and standards are contemplated herein, various communication mediums (e.g., wire, air), standards making bodies (e.g., 3GPP, IETF, IEEE), and protocols are contemplated herein.

Communications protocols contemplated herein may be connectionless or connection-based. For example, Transmission Control Protocol (TCP) may be used to establish state-based or connection-based communication between a client (e.g., device 102), a computing device 122, or components, hops, nodes, instances, functions there between, or combinations thereof. A protocol may define header and payload information for packets of information. Headers may define various configurations and settings associated with the transmitted payload.

Figure 2:
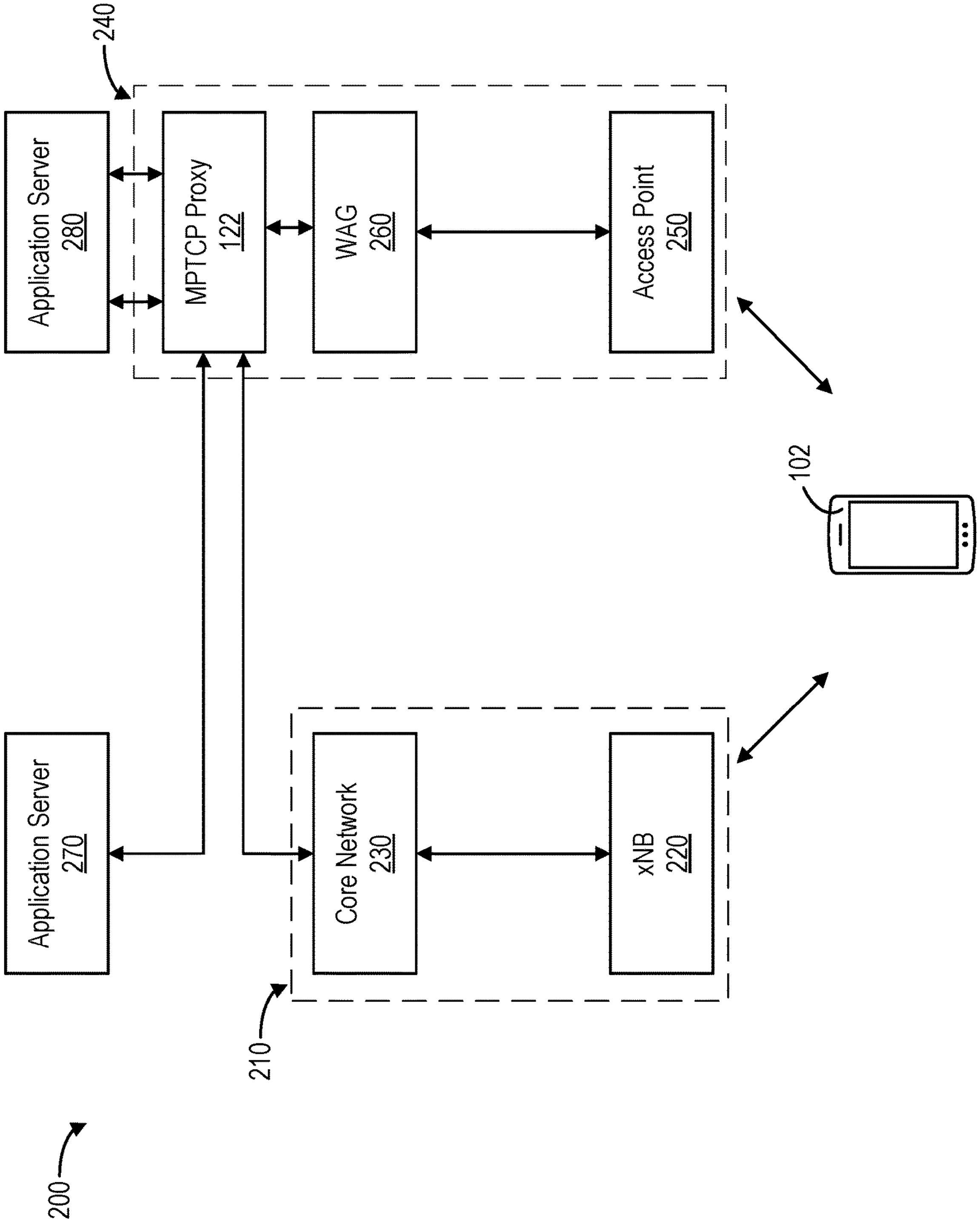
FIG. 2 shows an example communication architecture in accordance with one or more implementations of the present disclosure.

FIG. 2 shows a network 210 (e.g., a network of an MNO) that may include wireless communication protocols between the device 102 and a cellular base station 220 (e.g., eNB, gNB, xNB), which may be part of a radio access network based on various radio access technologies. The radio access network may be associated with a network 210. For example, the network 210 (e.g., public land mobile network (PLMN)) may maintain the radio access network and the associated core network 230. The network 210 (e.g., an MNO) may issue subscriptions for the device 102 to access the network 210. The network 210 may include communications hardware and software to support various protocols and components (e.g., 3GPP 5G, IEEE 802.11). The terms MVNO, MSO, PLMN, MNO, and other operator indicators are intended for designation (e.g., first, second, third) to distinguish between different networks and are not intended to be rigid as terminology and scope of these and other terms is evolving in the field.

Another communication path may be established between the device 102 and computing device 122 over a network 240 (e.g., a network of an MSO) having a Wi-Fi or IEEE 802.11 access point 250. The access point 250 may be configured to communicate with a wireless access gateway 260. The wireless access gateway 260 may route data packets from the access point 250 to the network 130. A network (e.g., an MSO) may maintain the access point 250 and the associated wireless access gateway 260. The network may issue subscriptions for the device 102 to access one or more of the networks (e.g., network 210, network 240). The subscriptions may be issued in packages (e.g., subscription packages) and stored or unpacked on a SIM, an embedded SIM, or otherwise. The network associated with the access point 250 may be different than the network associated with the radio access network.

The core network 230 and wireless access gateway 260 are used as examples for context. It should be appreciated that standards may change the names of these entities as technologies improve and progress. The core network 230 and the wireless access gateway 260 may be configured to directly communicate over an interface. For example, an access and mobility function (AMF) may perform some or all of the steps described herein. The computing device 122 may be configured to perform all or some of the steps described. For example, the computing device 122 may orchestrate SIM provisioning based on a location pattern, a quantity of time, data consumption, or combinations thereof according to the device 102. The computing device 122 may be configured to send a request to the device 102 to determine whether the device 102 is interested in connecting over the MSO network with eSIM credentials. The computing device 122 may be or may be connected with a remote SIM provisioning system (SM-DP+). The device 102 may connect with the computing device 122, through the computing device 122, or according to the computing device 122 to obtain the eSIM or eUICC.

The computing device 122 may be associated with either the network 210 or the network 240. The computing device 122 may be independent of the network 210 and the network 240. For example, the computing device 122 may serve as an intermediary, receiving data from the device 102 over either of the networks 210, 240 or another network and providing a provisioning of the identifier and the key. The identifier and the key may be pushed or pulled.

The computing device 122 may include instructions to serve as a proxy or proxy server (e.g., an MPTCP proxy) for the plurality of paths formed between application servers 270, 280 and the device 102. For example, one or more application servers 270, 280 may be configured to send and receive communications with the computing device 122 based on communications from the device 102 over one or more paths associated with networks 210, 240.

Figure 3:
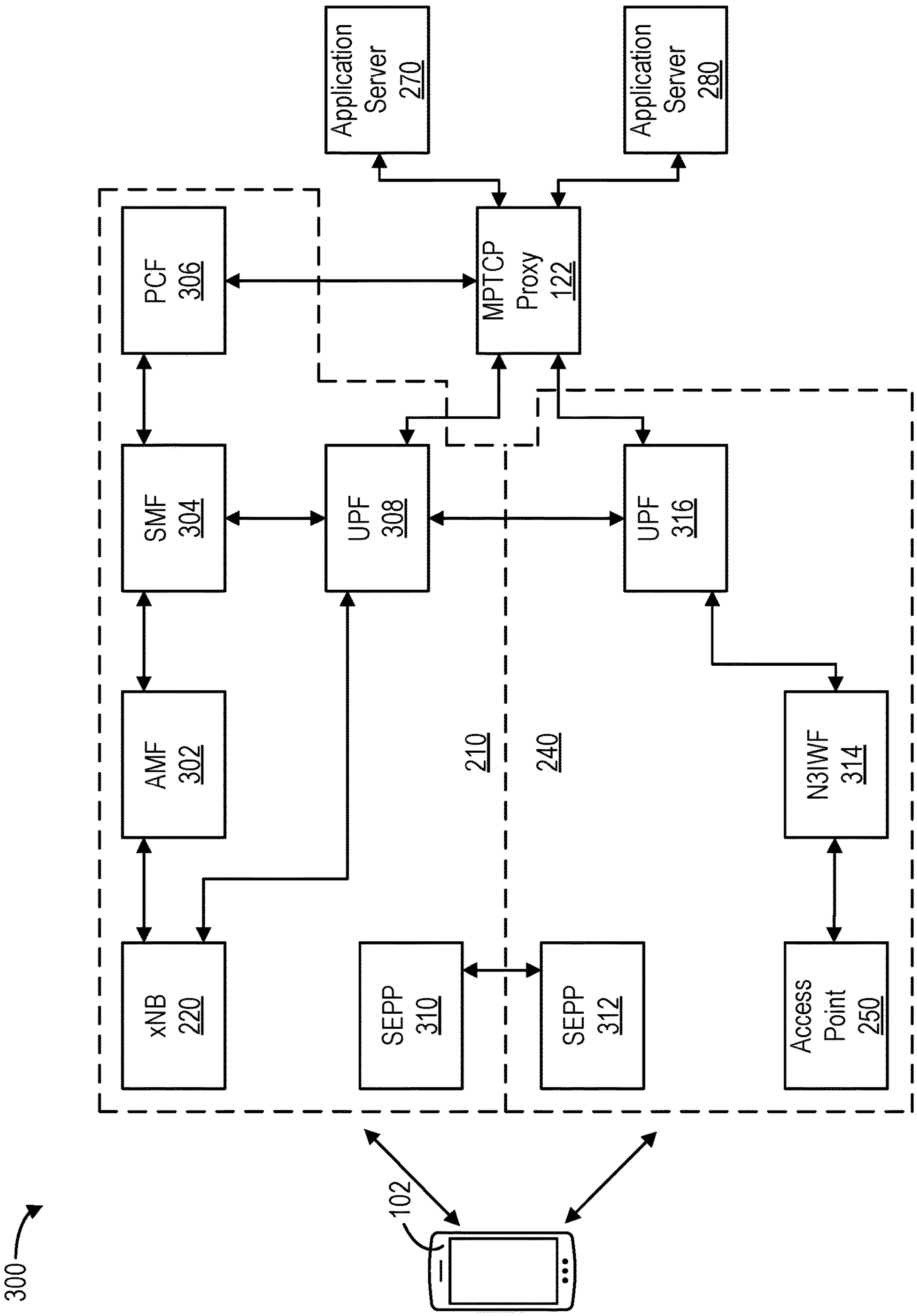
FIG. 3 shows an example architecture with an interworking function in accordance with one or more implementations of the present disclosure.

FIG. 3 shows an example architecture 300 with an interworking function 314 in accordance with one or more implementations of the present disclosure. The interworking function 314 may be connected with a user plane function 316 of network 240. The interworking function 314 may provide the device 102 access to the computing device 122. User plane functions 308, 316 may be connected over an N9 interface. The N9 interface may be encapsulated by the connection provided by SEPP 310, 312. A policy control function 306 may be configured to communicate with the computing device 122 over an N6 interface while each user plane function is individually connected with the computing device 122 over respective interfaces. These interfaces may comprise an N6 interface, an Nx interface, or another applicable interface. As an example, the computing device 122 may be part of a data network associated with a PLMN (e.g., network 210, 240). The data network may be separate from a voice network associated with either of the networks 210, 240. The computing device 122 may be part of a network independent from either of the networks 210, 240 and hosted by a third party. As an example, the computing device 122 may be provisioned on a cloud-computing server accessible over the Internet.

As an example, the interworking function 314 or other functions may be configured to authenticate with the network 210. For example, the device 102 may include a credential circuit comprising authentication credentials for network 210. For example, the device 102 may include a credential circuit comprising authentication credentials (e.g., identifiers, keys) for network 240. The authentication credentials may provide cross-validation and access to either network 210 or network 240. For example, the authentication credentials may be associated with network 240 and traverse the interworking function 314, providing access to network 240 from the device 102. The same authentication credentials may indicate access, from network 240 to network 210. An indication may be provided from network 240 to network 210 indicating that access is authorized without provided credentials specific to network 210. In such a way, access to network 210 may be achieved with authentication credentials for network 240 or vice versa. As an example, in combination or separate, the authentication credentials may be based on an eSIM (e.g., embedded SIM) associated with the device 102. The authentication credentials may be issued by network 240 associated with the interworking function 314. The authentication credentials may provide access to the network of network 210.

The example architecture 300 may include an interworking function 314. The interworking function 314 may be a non-3GPP interworking function (N3IWF). The interworking function 314 may be associated with an access point 250 of one of the networks (e.g. network 240). Also shown is an interworking function 314 that may be associated with an access point 250 of the other of the networks (e.g., network 210). The interworking function 314 may provide access to 3GPP functions from a non-3GPP access point. As an example, the access point 250 may be configured to communicate over IEEE 802.11 or other protocols. For example, the access point 250 may be one or more hotspots associated with a public, corporate, or otherwise access network. The interworking function 314 may allow PDU session establishment and user plane functionalities (e.g., quality of service). In such away, the device 102 may be configured to connect to a network having 3GPP functions (e.g., packet-switched gateways, user plane functions). For example, the interworking function 314 may provide the device 102 access to user plane function 316. As an example, the interworking function 314 may determine corresponding commands or instructions based on communications from the device 102 sent over the access point 250 for translation to the user plane function 316.

As shown in FIG. 3, the example architecture 300 may include respective networks 210, 240 having respective security edge protection proxies (SEPP) 310, 312. The SEPPs 310, 312 may provide for a path for signaling traffic across network. The communication between SEPPs 310, 312 may be authenticated and constituting all or part of an N32 interface. As an example, the user plane functions 308, 316 may establish communications over an N9 interface. The N9 interface may be encapsulated by the SEPPs 310, 312 and sent over the N32 interface between the two networks 210, 240. Although shown as direct communication channels, all inter-PLMN communications may be transmitted through the N32 interface.

Figure 4:
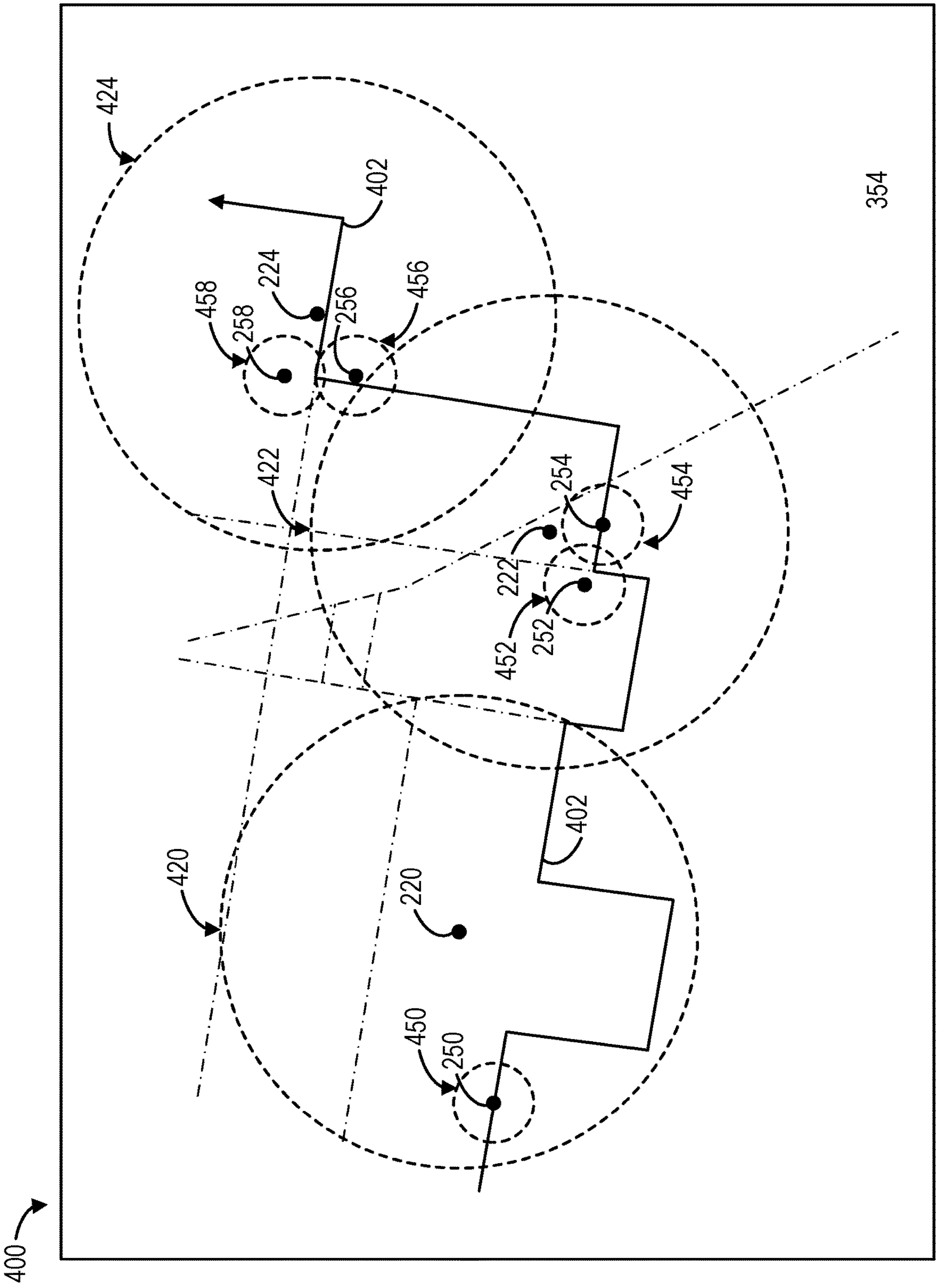
FIG. 4 shows a map in accordance with one or more implementations of the present disclosure.

FIG. 4 shows a map 400 in accordance with one or more implementations of the present disclosure. As shown on map 400, areas of reception 420, 422, 424, 450, 452, 454, 456, 458, 460, 462 may provide reception to the device 102 along route 402. For example, a network 240 may include areas of reception 450, 452, 454, 456, 458, 460, 462, providing service to offload data transfers from the network 210 associated with areas of reception 420, 422, 424 based on xNBs 220. Although shown as circular, the areas of reception 420, 422, 424, 450, 452, 454, 456, 458, 460, 462 may be any shape (e.g., ovoid, conical). The areas of reception 450, 452, 454, 456, 458, 460, 462 may form a general area of reception associated with network 240, and the areas of reception 420, 422, 424 may form a general area of reception associated with network 210. The areas of reception 450, 452, 454, 456, 458, 460, 462 may be formed by signals propagated by access points 250, 252, 254, 256, 258, or combinations thereof and the areas of reception 420, 422, 424 may be formed by signals propagated by nodes 220, 222, 224.

The device 102 may maintain the same state-based or connection-based connection (e.g., TCP connection) with the computing device 122 and along route 402 by connecting to various nodes 220, 222, 224, access points 250, 252, 254, 256, 258, or combinations thereof. For example, the device 102 may be connected to node 220 within area of reception 420 at the beginning of route 402 on a subflow over a path that comprises the node 220, the core network 230, and the computing device 122. The device 102 may be further connected to access point 250 within area of reception 450 on route 402 on a subflow over a path that comprises the access point 250, the wireless access gateway 260, and the computing device 122.

The device 102 may include subflows to more than one of the nodes 220, 222, 224 or more than one of the access points 250, 252, 254, 256, 258. For example, the device 102 may fall within more than one area of reception 420, 422, 424, 450, 452, 454, 456, 458 and be connected with subflows over accessible nodes 220, 222, 224 or access points 250, 252, 254, 256, 258.

Figure 5:
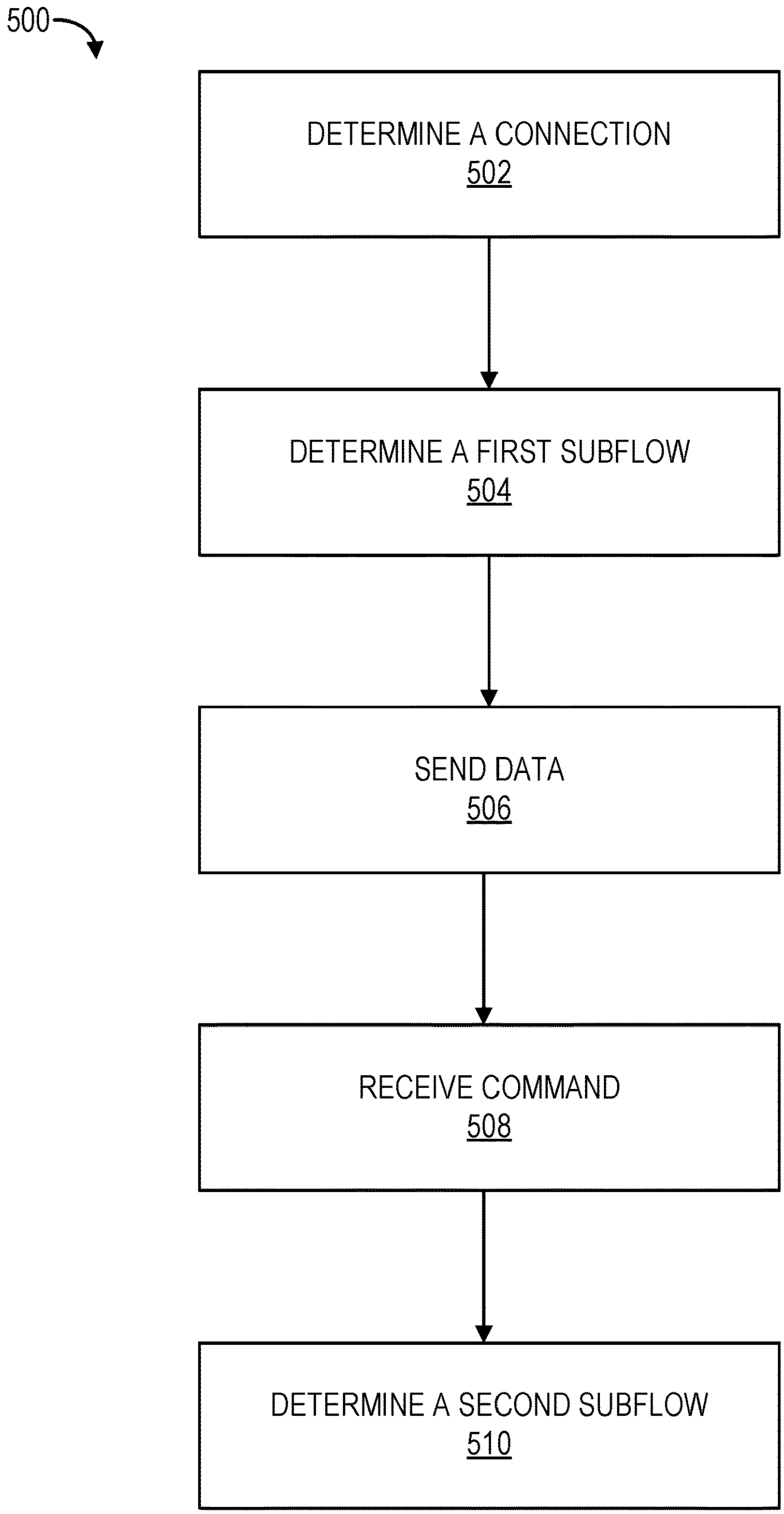
FIG. 5 shows a flowchart of an example method in accordance with one or more implementations of the present disclosure.

FIG. 5 shows a flowchart of an example method 500 in accordance with one or more implementations of the present disclosure. Any of the components or devices (e.g., device 102, computing device 122) or portions thereof may implement one or more of the steps in any of the methods described herein. In step 502, a connection may be determined. For example, a connection may be based on an identifier. The identifier may be indicative of a multipath connection to allow subflows to connect according to the same connection. The connection may be state-based, session-based, connection-based, another type of connection, or combinations thereof. For example, the connection may be a TCP connection.

The connection may be associated with a plurality of paths according to a multipath protocol. For example, the connection may include a path for each node 220, 222, 224 or access point 250, 252, 254, 256, 258 accessible to the device 102 or computing device 122. The paths may include gateways and other networking functions or devices of the networks 210, 240. The paths may include nodes or interconnections that overlap or are common to more than one of the paths. Individual paths may be defined or characterized according to having a node that is not common to another path.

The connection may be based on a request to activate the device 102 on a network. For example, the request may be a request to one or more of the nodes 220, 222, 224 or access points 250, 252, 254, 256, 258. The request may include one or more identifiers of the subscriber.

Access to the nodes 220, 222, 224 or access points 250, 252, 254, 256, 258 may be provided through an identifier of a subscriber. For example, a SIM or eSIM may include credentials for the subscriber. The credentials may provide access to networks 210, 240 of both operators. For example, an identifier of a subscriber may provide the subscriber with access to network 240 through network 210. As an example as described herein, the interworking function 314 or other functions may be configured to authenticate with the network 210. For instance, device 102 may include a credential circuit comprising authentication credentials for network 210. The device 102 may include a credential circuit comprising authentication credentials (e.g., identifiers, keys). The connection may be formed based on the identifier and the subflows may be formed based on the identifier.

In step 504, a first subflow may be determined. The first subflow may be based on the identifier of the connection. For example, the first subflow may be defined according to the connection over one or more of the plurality of paths. The subflow may be designated in a header of the packets sent over the subflow. The header may include the identifier of the connection.

In step 506, data may be sent over the subflow. The data may be assembled based on a data sequence mapping when distributed over more than one subflow. The data sequence map may be based on a first subflow sequence number associated with the first path and every other configured path of the connection. As such, the combination of the data from the first path and the data of the path may be combined based on the data sequence mapping to establish ordered data without a loss of integrity. The response may be disassembled into portions and retransmitted over the respective paths to improve throughput and speed in a similar fashion. The network between the application servers 270, 280 and the computing device 122 may be the Internet or another network. It should be appreciated that the combination sent to one or more of the application servers 270, 280 may be based on a quantity of sessions defined or based on the application servers 270, 280. The first network may be identified with a first identification number and the second network may be identified with a second identification number. The identification numbers may be unique.

In step 508, a command may be received indicative of a reset of the first subflow. For example, the reset may deconstruct the subflow based on the identification number, the sequence number, other information, or combinations thereof. The command may be defined in a packet header or packet data, signaling the reset to the computing device 122, the device 102, the application server 270, 280 or a combination thereof.

In step 510, a second subflow may be determined. For example, the second subflow may be triggered based on the command indicative of reset. The subflow may be formed over a second path of the plurality of paths. For example, the subflow may connect the device 102 through a different node of the nodes 220, 222, 224, or a different access point of access points 250, 252, 254, 256, 258, than the first path. In such a way, the same connection may be maintained between the device 102 and one or more of the application servers 270, 280 while disconnecting the device 102 from the first path.

The command indicative of the reset for the first subflow may be sent after the subflow is formed over the second path. For example, both the first subflow and the second subflow may be pending in a make-before-break type interaction. The command indicative of reset may be sent after the subflow is established to leave the second subflow as an available information path and deconstruct the first subflow.

Figure 6:
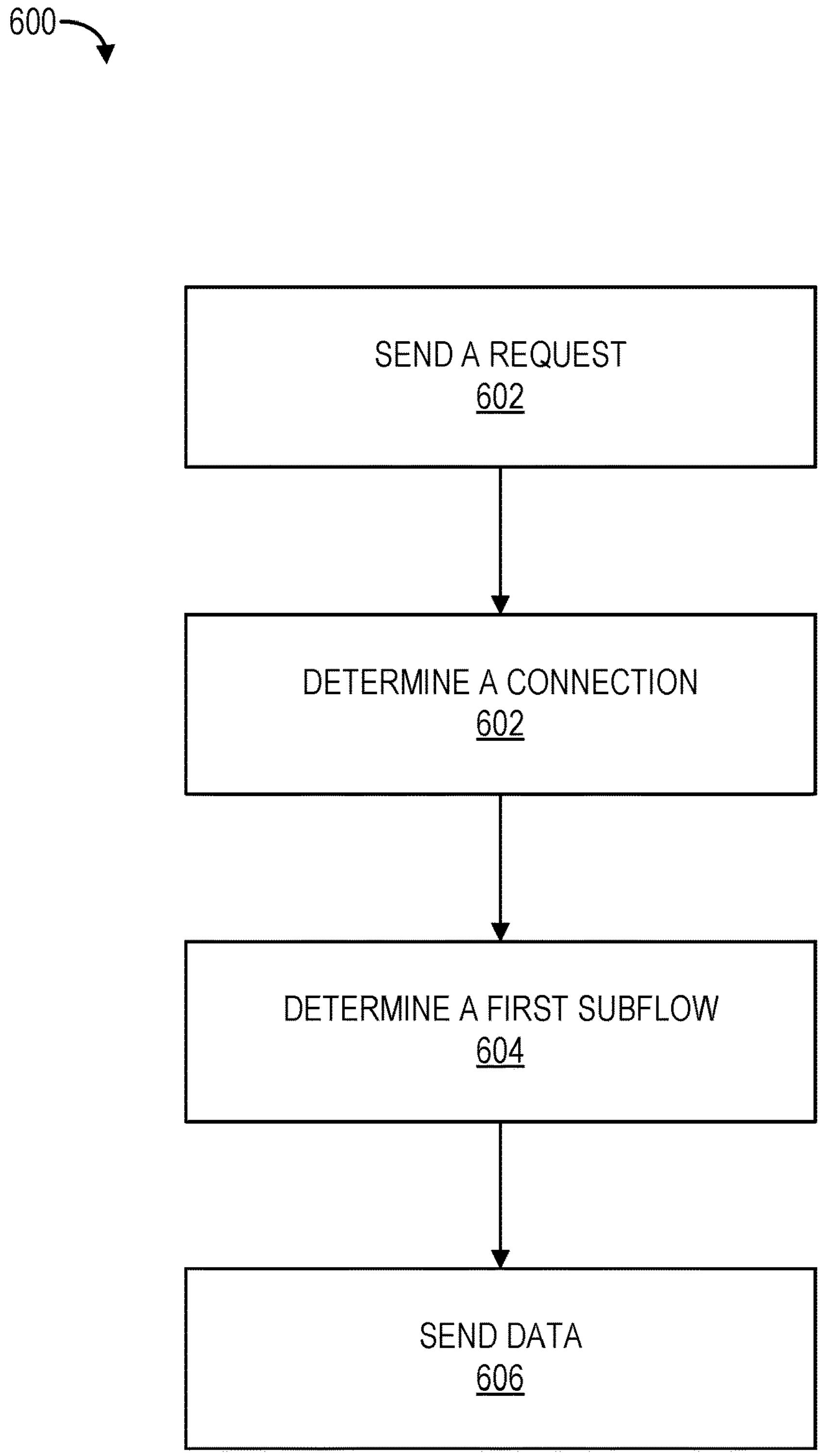
FIG. 6 shows a flowchart of an example method in accordance with one or more implementations of the present disclosure.

FIG. 6 shows a flowchart of an example method 600 in accordance with one or more implementations of the present disclosure. Any of the components or devices (e.g., device 102, computing device 122) or portions thereof may implement one or more of the steps in any of the methods described herein. In step 602, a request may be sent. For example, the request may be sent by the device 102. The request may be configured to activate or request activation of the device 102 on the network. For example, the request may include an identifier of a subscriber or other credentials for establishing the device 102 on a network. The request may be a request to one or more of the nodes 220, 222, 224 or access points 250, 252, 254, 256, 258. The request may include one or more identifiers of the subscriber.

In step 604, a connection may be determined. For example, a connection may be based on an identifier, the request, or a combination thereof. The identifier may be indicative of a multipath connection to allow subflows to connect according to the same connection. The connection may be state-based, session-based, connection-based, another type of connection, or combinations thereof. For example, the connection may be a TCP connection.

The connection may be associated with a plurality of paths according to a multipath protocol. For example, the connection may include a path for each node 220, 222, 224 or access point 250, 252, 254, 256, 258 accessible to the device 102 or computing device 122. The paths may include gateways and other networking functions or devices of the networks 210, 240. The paths may include nodes or interconnections that overlap or are common to more than one of the paths. Individual paths may be defined or characterized according to having a node that is not common to another path.

Access to the nodes 220, 222, 224 or the access points 250, 252, 254, 256, 258 may be provided through an identifier of a subscriber. For example, a SIM or eSIM may include credentials for the subscriber. The credentials may provide access to networks 210, 240 of both operators. For example, an identifier of a subscriber may provide the subscriber with access to network 240 through network 210. As an example, as described herein, the interworking function 314 or other functions may be configured to authenticate with the network 210. For example, the device 102 may include a credential circuit comprising authentication credentials for network 210. In an example, the device 102 may include a credential circuit comprising authentication credentials (e.g., identifiers, keys). The connection may be formed based on the identifier and the subflows may be formed based on the identifier.

In step 606, a first subflow may be determined. The first subflow may be based on the identifier of the connection. For example, the first subflow may be defined according to the connection over one or more of the plurality of paths. The subflow may be designated in a header of the packets sent over the subflow. The header may include the identifier of the connection.

In step 608, data may be sent over the subflow. The data may be assembled based on a data sequence mapping when distributed over more than one subflow. The data sequence map may be based on a first subflow sequence number associated with the first path and every other configured path of the connection. As such, the combination of the data from the first path and the data of the path may be combined based on the data sequence mapping to establish ordered data without a loss of integrity. The response may be disassembled into portions and retransmitted over the respective paths to improve throughput and speed in a similar fashion. The network between the application servers 270, 280 and the computing device 122 may be the Internet or another network. It should be appreciated that the combination sent to one or more of the application servers 270, 280 may be based on a quantity of sessions defined or based on the application servers 270, 280. The first network may be identified with a first identification number and the second network may be identified with a second identification number. The identification numbers may be unique.

The network functions described herein may be generally referred to as a generic combination function that may run on one or more servers, one or more instances, one or more sets of instructions, and so on. Such instances may be containerized, replicated, scaled, and distributed by network 210, 240 to meet the growing demands of respective networks. Any of the steps or functions described in one or more of the methods, architectures, or call flows described herein may be used in conjunction with any of the other methods, architectures, or call flows described herein. Any of the components (e.g., network functions, user equipment, servers) may perform any of the steps from any of the methods or call flows described herein even though not specifically described and may be performed in combination with any of the other components. It should be appreciated that the techniques described herein relate to various protocols and technology and may at least apply to 3G, LTE, and 5G technologies.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method comprising:

determining, based on a request to activate a user device on a first network and based on an authentication of the user device to access the first network according to a first identifier configured to grant the user device access to a second network, a multipath connection with the user device according to a second identifier of the multipath connection, wherein the user device is granted access to the first network according to the first identifier, wherein the first network receives the first identifier from the second network;

determining, based on the second identifier of the multipath connection, a subflow over a path of the multipath connection with the user device over the first network; and sending data over the subflow.

2. The method of claim 1, further comprising:

receiving a command indicative of a reset of the subflow; and based on the command indicative of the reset, determining a second subflow over a second path of the multipath connection with the user device over the second network.

3. The method of claim 2, wherein the subflow is determined based on the first identifier.

4. The method of claim 2, wherein the second subflow is determined based on the second identifier.

5. The method of claim 1, further comprising:

determining a second subflow over a second path of the multipath connection with the user device over the second network; and based on determining the second subflow, receiving a command indicative of a reset of the subflow.

6. The method of claim 1, further comprising:

receiving the request according to the first network.

7. The method of claim 1, wherein the first network is associated with a mobile network operator (MNO) and the second network is associated with a multiple system operator (MSO).

8. A method comprising:

sending a request to activate a user device on a first network according to a first identifier configured to grant the user device access to a second network, wherein the user device is granted access to the first network according to the first identifier, wherein the first network receives the first identifier from the second network;

determining, based on the request and based on an authentication of the user device to access the first network according to the first identifier, a multipath connection with the user device according to a second identifier of the multipath connection;

determining, based on the second identifier of the multipath connection, a subflow over a path of the multipath connection with the user device over the first network; and sending data over the subflow.

9. The method of claim 8, further comprising:

sending a command indicative of a reset of the subflow; and based on the command indicative of the reset, determining a second subflow over a second path of the multipath connection with the user device over the second network.

10. The method of claim 9, wherein the subflow is determined based on the first identifier.

11. The method of claim 9, wherein the second subflow is determined based on the second identifier.

12. The method of claim 8, further comprising:

determining a second subflow over a second path of the multipath connection with the user device over the second network; and based on determining the second subflow, sending a command indicative of a reset of the subflow.

13. The method of claim 8, further comprising:

sending the request according to the first network.

14. The method of claim 8, wherein the first network is associated with a mobile network operator (MNO) and the second network is associated with a multiple system operator (MSO).

15. An apparatus comprising:

one or more processors; and memory storing and processor-executable instructions that, when executed by the one or more processors, cause the apparatus to:

send a request to activate a user device on a first network according to a first identifier configured to grant the user device access to a second network, wherein the user device is granted access to the first network according to the first identifier, wherein the first network receives the first identifier from the second network;

determine, based on the request and based on an authentication of the user device to access the first network according to the first identifier, a multipath connection with the user device according to a second identifier of the multipath connection;

determine, based on the second identifier of the multipath connection, a subflow over a path of the multipath connection with the user device over the first network; and send data over the subflow.

16. The apparatus of claim 15, wherein the processor-executable instructions, when executed by the one or more processors, further cause the apparatus to:

send a command indicative of a reset of the subflow; and based on the command indicative of the reset, determine a second subflow over a second path of the multipath connection with the user device over the second network.

17. The apparatus of claim 16, wherein the subflow is determined based on the first identifier.

18. The apparatus of claim 16, wherein the second subflow is determined based on the second identifier.

19. The apparatus of claim 15, wherein the processor-executable instructions, when executed by the one or more processors, further cause the apparatus to:

determine a second subflow over a second path of the multipath connection with the user device over the second network; and based on determining the second subflow, send a command indicative of a reset of the subflow.

20. The apparatus of claim 15, wherein the processor-executable instructions, when executed by the one or more processors, further cause the apparatus to: send the request according to the first network.

* * * * *